Patented Mar. 21, 1950

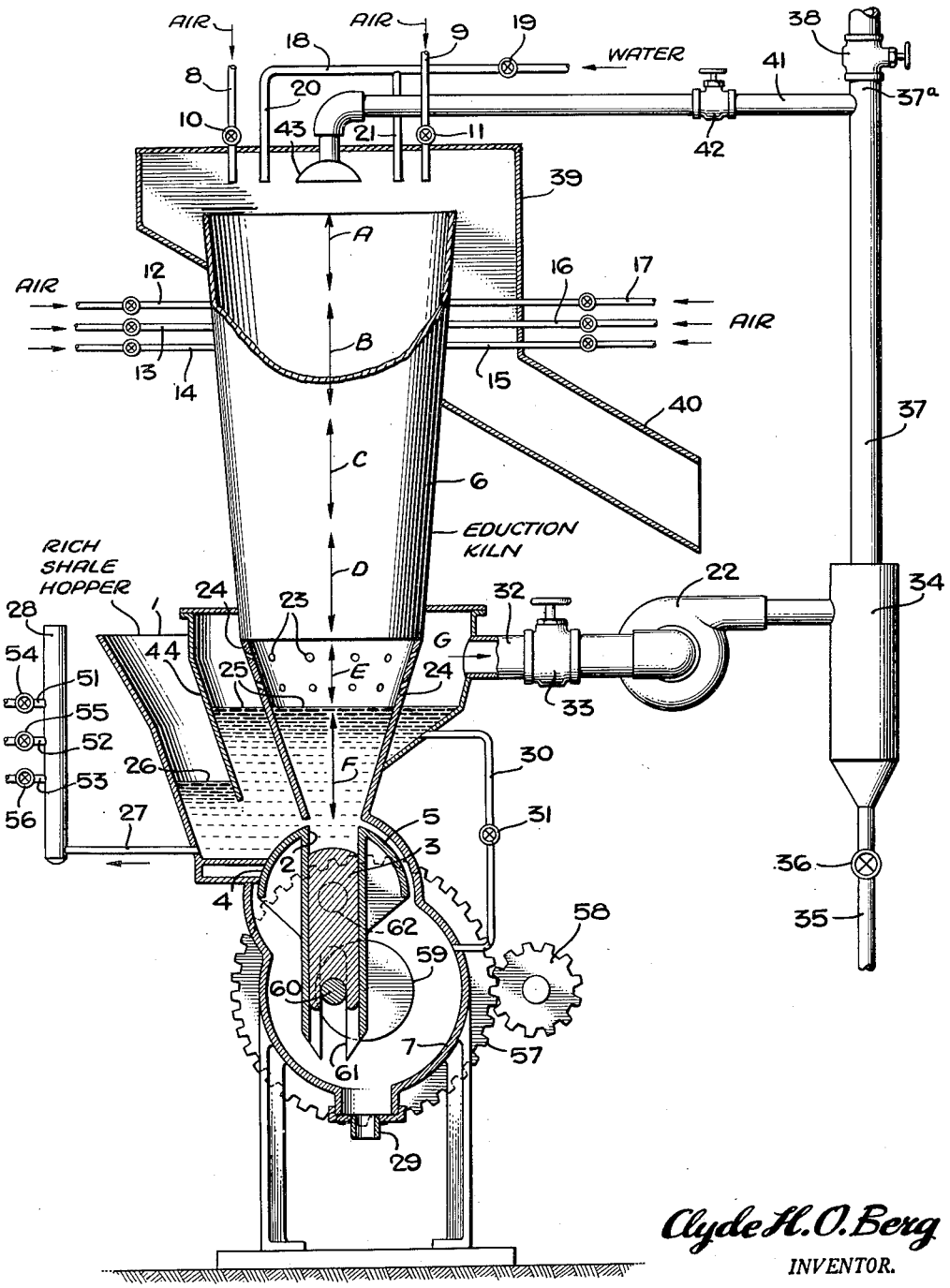

2,501,153

UNITED STATES PATENT OFFICE 2,501,153

SHALE OIL EDUCTION

Clyde H. O. Berg, Long Beach, Calif., assignor to Union Oil Company of California, Los Angeles, Calif., a corporation of California Application January 21, 1947, Serial No. 723,311

18 Claims. (Cl. 202—6)

The present invention relates to a process and apparatus for recovery of oil from shales, diatomite, coarse tar sands and like materials which may be termed "oil-bearing solids." The invention is particularly directed to an improved process and apparatus in which oil shales are rapidly educted and the oil and gases are removed immediately upon formation with a minimum of cracking or destructive distillation of the oil.

This application is a continuation-in-part of my copending application Serial No. 533,627, filed May 1, 1944, and my copending application Serial No. 582,343, filed March 12, 1945, both now abandoned.

The recovery of oils from solid oil-bearing or oil-producing materials, particularly from oil shales is well known. This is generally accomplished by heating or roasting the oil-bearing or oil-producing material at temperatures sufficiently high to educt the oil and separate it from the mineral matter. These processes have not been entirely satisfactory, due principally to the inefficient and subsequent loss of heat which is an expensive factor in shale oil recovery. There are a number of processes which are adapted to treat relatively large solid particles during the process of eduction. This is not entirely desirable since a considerable time of contact is necessary for the heat to penetrate the relatively large particles of shale or other solid substances. As a result of the relatively long time of contact, an undesirably large amount of the hydrocarbon is decomposed and converted to noncondensable gases and carbon or carbonaceous solids. There are still other processes which educt shale oil from oil shale by means of external heat alone, in a suitable apparatus, or by external heat in conjunction with a limited amount of steam.

The above-mentioned methods have proved themselves of somewhat limited value in many respects because the oil educted is usually of low specific gravity, containing reduced percentages of lubricating stock and waxes and an excessive amount of unsaturates. Another disadvantage in the above-mentioned processes is the excessive production of less desirable constituents, such as carbon monoxide and hydrocarbon gases.

It is thus an object of my invention to provide a process and apparatus by which oil and hydrocarbon vapors may be readily and efficiently recovered at relatively low temperatures from oil-bearing solid substances by means of the sensible heat of an eduction medium comprising hot flue gas, hot lean shale gas and steam when used. The oil educted from oil shale by the application of my invention contains a greater percentage of lubricants and waxes and is more saturated, i. e., contains a higher ratio of hydrogen to carbon than oil educted by the aforementioned process used in the prior art.

Briefly stated, the process of my invention for the educting of oil from oil-bearing granulated solids includes the step of introducing these granulated solids into an eduction kiln through a hot seal liquid comprising the liquid eduction products thereby initially preheating the solids and also preventing ingress of air into the eduction kiln, together with the step of continuously moving a bed of the oil-bearing solids upward through a kiln wherein the temperature is gradually and continuously increased in the direction of the solid flow to a maximum temperature at which substantially all the oil has been educted, while countercurrently contacting the moving bed with a downward moving stream of an eduction medium.

More specifically, my invention involves the continuous eduction of oil from oil shales and other oil-bearing solids in a vertical kiln through which the oil-bearing solids are caused to flow in an upward direction. As stated above, the oil-bearing solids are subjected to a countercurrent flow of hot products of eduction and combustion serving to continuously increase the temperature of these oil-bearing solids in the direction of solids flow to a temperature sufficient to effect a substantially complete eduction of oil. The hot gaseous and liquid eduction products flow downwardly countercurrent to the rising solids serving to heat them and simultaneously cool the eduction products in direct heat exchange. The educted solids, freed of oil, contain residual amounts of carbonaceous material which are burned in the upper portion of the kiln in the presence of an oxygen-containing gas thereby providing hot flue gases which in turn contact and heat the oil-bearing solids and cause the eduction of oil therefrom. The spent solids, burned free of carbonaceous material, are removed from the upper end of the kiln and the educted products and flue gases are removed from the lower portion. The hot liquid eduction products collect in the lower portion of the kiln forming a seal and serve to initially preheat the incoming oil-bearing solids as well as to prevent the ingress of air into the kiln via the inlet through which the fresh oil-bearing solids are introduced. The fresh solids are injected into the kiln at a point below the surface of the liquid eduction products by a feeder particularly adapted for handling materials such as oil shales and the like. This process is particularly characterized by its high thermal efficiency, uniformity in treatment, and moderate equipment cost. Therefore, my process overcomes previous inherent difficulties present in processes employed for the removal and recovery of oils from shales and the like, and permits a maximum recovery of the oils with a minimum amount of cracking.

The process and apparatus of my invention may be readily understood by reference to the attached diagrammatic drawing illustrating the same. The figure shows the complete apparatus adapted to the eduction of oil from oil shale.

Referring to the figure, rich oil shale from crushers is introduced into rich shale hopper 1 by means of elevators, conveyors or the like not shown and is introduced into eduction kiln 6 by means of a positive solids feeder more fully described hereinafter. The oil shale is forced upwardly into vertical eduction kiln 6 by means of piston 3 and passes successively through zones F, E, D, C, B, and A. Simultaneously, air is drawn downward into kiln 6 through lines 8 and 9, controlled by valves 10 and 11 respectively, or through any of the air lines designated as 12, 13, 14, 15, 16 or 17. This air serves to burn the carbonaceous shale in zone B, thus raising the temperature of the shale to about 1,600° F. and freeing it from carbon. The hot carbon-free shale in zone B is gradually moved upward in the eduction kiln under the force exerted by piston 3 and into heat exchange zone A. Water may be introduced into zone A of eduction kiln 6 via line 18 controlled by valve 19 and then through lines 20 and 21. The water introduced into the upper portion of the eduction kiln contacts the hot carbon-free shale in direct countercurrent heat exchange thereby producing steam and cooling the carbon-free shale in zone A prior to its removal from the eduction kiln. The steam produced in zone A together with the hot flue gas produced in burning zone B travels downward through eduction kiln 6 under a draft induced by pump 22 and into eduction zone C where the combined gases countercurrently contact the upwardly moving rich oil shale causing a gradual increase in the temperature of the shale to a value sufficiently high to permit educting the liquid hydrocarbons and lean shale gas therefrom.

The gaseous and liquid hydrocarbons educted in zone C, together with superheated steam generated in zone A and the flue gas generated in zone B, pass downwardly through zone D countercurrent to the fresh oil shale rising therethrough. In zone D a direct heat interchange between the downwardly flowing materials and the upflowing shale occurs, the shale being further heated by the condensation of the educted gaseous hydrocarbons and the cooling of the flue gas, superheated steam, and educted liquid hydrocarbons. The flue gas, steam and educted hydrocarbons flow downwardly through zone D into zone E which is equipped with a series of perforations 23 through eduction kiln wall 24. The perforations are formed in wall 24 in such a manner so as to allow the passage therethrough of the flue gas and steam but substantially completely prevent the passage of the educted liquid hydrocarbons and the shale particles. The educted liquid hydrocarbons together with the hydrocarbons condensed in heating the rich oil shale in zone D flow downwardly through zone E and collect in zone F forming an accumulation of hot educted oil. This accumulation of hot educted oil has a liquid level 25 in zones F and G (which surrounds zones E and F and communicates with hopper 1 at its lower end) which level is substantially higher than the liquid level 26 in rich shale hopper 1 due to the decreased internal pressure in zone G caused by pump 22. In order for the educted oil to be removed it must pass downwardly through zone F, countercurrent to the rich oil shale forced upwardly therethrough by the action of piston 3 in the positive shale feeder, through the clearances provided between kiln wall 24 and guards 4 and 5, and into hopper 1 from which it is removed by means of line 27 into standpipe 28. The educted oil is removed from the standpipe, the upper end of which is open to the atmosphere, through any of lines 51, 52, or 53 controlled by valves 54, 55, and 56, respectively. The height to which the liquid educted oil stands in zone F may be varied by selecting the proper outlet line from standpipe 28. Removal of educted oil from the lowest point in hopper 1 also insures the maintenance of the hot educted oil seal and prevents the accumulation of water in zone F or feeder housing 7. The upward passage of the rich oil shale through zone F countercurrent to the downward flowing educted oil serves to cool the educted oil and in turn effect an initial preheating of the shale. The accumulation of the educted oil in zone G, in addition to initially preheating the rich oil shale serves as an oil seal between rich shale hopper 1 and zone F and permits the continuous introduction of rich oil shale from hopper 1 into eduction kiln 6 without the simultaneous ingress of air. The effective sealing of the shale feeding mechanism so that this ingress of air is prevented is important to the operation because it substantially completely eliminates the possibility of the formation of explosive air-hydrocarbon mixtures in zones F and G and thereby permits pump 22 to induce a positive downward flow of gases and educted liquids through eduction kiln 6. The accumulation of educted oil extends downward into housing 7 and also serves as a lubricant for cylinder 2 and piston 3 in the shale feeder in addition to its functions of sealing and shale preheating.

It will also be noted that by the construction described, the bulk of the shale fines passing from zones D or E to zones F or G drop back into cylinder 2 and are recycled with the fresh shale. Thus the bulk of the fines eventually are carried to the top of the kiln. The small amounts which escape cylinder 2 and drop into positive shale feeder housing 7 are removed therefrom by means of line 29 and discarded or recycled. In order to prevent any pressure being created in housing 7 by the reciprocating movement of piston 3, line 30, controlled by valve 31, is provided which connects housing 7 with shell 44 surrounding zone G thereby allowing any pressure created in housing 7 to escape into zone G. The liquids in zone G are withdrawn therefrom by means of line 27 to standpipe 28 and removed therefrom as described above and are subsequently pumped to a suitable distillation column for processing, not shown. The light gases, such as cooled flue gas, lean shale oil gas and light hydrocarbon gases in zone G are removed at a point above the liquid level by means of pump 22 and line 32 controlled by valve 33 and passed into separator 34. Any liquid fractions settle to the bottom of the separator and are removed therefrom by means of line 35 controlled by valve 36 and pumped to a suitable distilling unit for processing, not shown. The flue gas and lean shale oil gas in separator 34 are removed from the top thereof by means of lines 37 and 37a, controlled by valve 38 and pumped to a suitable processing unit, not shown.

From the above description it will be seen that the rich oil shale introduced into eduction kiln 6 from hopper 1 will pass upward through the hot oil in zone F and be initially preheated therein. It will subsequently pass upward through zone E and into zone D wherein it will be further heated by coming in direct contact with a countercurrent flow of hot flue gas, steam, and educted oil vapors. The temperature of the upwardly moving rich oil shale is gradually and continually increased in zones F, E, and D to a maximum value at which substantially all the oil is educted in zone C by means of a countercurrent flow of hot flue gas and steam and educted oil formed in zone C and above in zones B and A. The educted shale, which is now designated as carbonaceous shale since it contains a small amount of residual carbon or carbonaceous material, continues its upward movement into burning zone B where it contacts air introduced therein through lines 8 and 9 and which will cause the carbon to be burned therefrom forming a substantially carbon-free shale. The extremely hot carbon-free shale having a temperature of about 1,600° F. will in its upward course enter heat exchange zone A and therein give up its heat to the introduced water when used forming steam. The cooled spent shale in zone A will continue its upward movement and spill or be raked over the top of eduction kiln 6 and into spent shale hopper 39. The spent shale in hopper 39 cascades down through chute 40 to be disposed of in any suitable manner.

The positive shale feeder shown in the figure in general consists of housing 7 containing cylinder 2, piston 3, and guards 4 and 5 suspended within. The crushed rich oil shale from shale hopper 1 cascades down through the liquid seal of hot educted oil as previously described into cylinder 2, said cylinder during the filling period being directly under the mouth of hopper 1. Piston 3 during the filling period is moving downward toward the lower extremity of cylinder 2. When cylinder 2 is filled with rich shale the positive feeding device consisting of cylinder 2, piston 3 and guards 4 and 5 is gradually revolved in an arc to a position where cylinder 2 is directly under the mouth of eduction kiln 6 at the lower end of zone F. During the movement of said positive feeding device from the mouth of hopper 1 to the mouth of eduction kiln 6 piston 3 gradually begins to move upward in cylinder 2 thereby forcing the rich oil shale up into kiln 6. When cylinder 2 is under kiln 6 guard 4 will close the mouth of hopper 1 thus preventing any rich shale falling down into feeder casing 7. Guard 5 will prevent shale from falling down out of eduction kiln 6 when cylinder 2 is positioned under shale hopper 1. 57 represents a gear which is motivated by gear 58 which is attached to a suitable prime mover not shown. 59 represents another gear attached directly to gear 57 and having pin 60 attached to its outside circumference. The other end of pin 60 is connected to the bottom of piston 3 and slides up and down in slot 61 positioned in cylinder 2. 62 represents another pin attached to the outside shell of and acts as a pivot point for cylinder 2.

The positive shale feeder removes shale from hopper 1 and introduces it into zone F of eduction kiln 6. The rotation of gear 59 causes piston 3 to move in cylinder 2 and also causes cylinder 2 to oscillate through an arc of about 40° to the left of a vertical position. At the left extremity of this oscillation the upper opening of cylinder 2 is directly below shale hopper 1 and piston 3 moves downward allowing a portion of rich shale to enter the upper portion of cylinder 2. The cylinder then moves toward the right extremity of the oscillation, i. e., to a position in which its longitudinal axis is vertical, while piston 3 begins to rise forcing the rich shale upward into zone F. With piston 3 positioned in the uppermost part of cylinder 2, the cylinder is turned on the axis of pin 62 back toward the left extremity of oscillation to a position below rich shale hopper 1 completing the cycle of oscillation. The shale feeder operates completely submerged in a body of liquid eduction products.

As shown and described above, the hot gaseous mixture in zone G consisting of flue gas, lean shale gas and steam is removed therefrom by means of pump 22 through line 32 controlled by valve 33, and introduced into cyclone separator 34. The gaseous mixture is then removed from cyclone separator by means of lines 37 and 37a controlled by valve 38 and passed to a suitable vapor recovery system, not shown.

In a modification of the above method the gaseous mixture is withdrawn from zone G by means of pump 22 through line 32, controlled by valve 33 and introduced into cyclone separator 34 and removed therefrom by means of line 37. In this modification valve 38 is at least partially closed and at least part of the gaseous mixture is recirculated via line 41 controlled by valve 42 to the head of eduction kiln 6, where it is drawn into said kiln through duct 43 by the draft induced by pump 22. This modification is especially useful where the amount of steam produced by heat exchange of the carbon-free shale and water is insufficient for complete eduction of oil shale in zone C. The recirculation of the gaseous mixtures to the top of the eduction kiln will improve the efficiency of eduction in zone C by supplying a larger volume of heating and stripping gases. It will also provide additional heat since the combustible constituents present in the mixture will be burned in zone B. The amount of the gaseous mixture recirculated into the kiln may be controlled to produce the optimum conditions for eduction of the shale. Any excess of said gaseous mixture in lines 37 and 41 may be dithdrawn from the system by means of line 37a and controlled by valve 38 and then pumped to any conventional vapor recovery system, not shown.

Another means of modifying the operation lies in controlling the burning in zone B at any desired level in the eduction kiln. In order to accomplish this, air lines 12, 13, 14, 15, 16 and 17 are built into the sides of eduction kiln 6 as shown in the figure. For example, if it should be desired to limit the burning zone to the lower part of zone B all that is necessary is to shut off the air drawn in through lines 8 and 9 by means of valves 10 and 11, respectively, and open lines 14 and 15 and introduce the air therethrough which will limit the burning to that region. By this means the relative sizes of zones A, B, and C may be controlled. This provides for operation with shales of different oil content in the same unit. It is also possible by regulating the above means to limit the amount of air introduced to an amount insufficient to burn completely all the carbon on the carbonaceous material and all the combustible material in the recycled gases. This may become desirable if excessive cracking takes place in the eduction kiln as a result of excessive heat created in the eduction kiln by complete burning of the carbonaceous shale. This modification controls the degree of burning of the carbon on the carbonaceous shale, thereby lowering the temperature in the eduction kiln and thereby reducing cracking to the desired degree.

The process of the present invention may be widely varied. For example, the lower part of the kiln may be fabricated with a series of steps instead of the conical design shown. The positive feeding mechanism described may be operated by means of hydraulic cylinder instead of gears wherein the reciprocating movement of piston 3 may be controlled independently of the oscillating motion of the cylinder 2.

The invention may be adapted for the recovery of oils from any oil-bearing solid, but is particularly directed to the recovery of shale oil from oil shale. In some instances in which the residue remaining after the eduction is not carbonaceous, the heat may be supplied from an external source such as by the burning of recycled combustible gaseous products of eduction, or like means.

In such instances where the carbonaceous residual material remaining on the educted shale is of sufficient amount, the introduction of water into the upper portion of kiln 6 to produce steam may be dispensed with because sufficient quantities of heated flue gases are obtained by burning the carbonaceous residue to supply all heat required for eduction as well as gases required to sweep the educted products downward through the kiln.

The term "eduction" is intended to include any means of treatment of the oil-bearing solids whereby oil is obtained therefrom. Zones A, B, C, and D may be collectively termed the "treating zone." Zones E and F may collectively be termed the "withdrawal zone"; zone G may be termed the "accumulation zone"; the zone enclosed by hopper 1 may be termed the "feeding zone"; the zone enclosed by housing 7 may be termed the "pumping zone"; and zones E, F and G and the pumping zone may be collectively termed the "sealing zone." The term "oil" is meant to include the organic compounds resulting from the eduction whether solid, liquid, or gaseous, and whether comprising only hydrocarbons, or other organic compounds such as oxygenated compounds, sulfur compounds, and nitrogen bases.

In the practice of my invention as described above the shale should be crushed.

The foregoing description of my invention is not to be taken as limiting my invention but only as illustrative thereof since many variations may be made by those skilled in the art without departing from the scope of the following claims.

I claim:

1. A continuous method of recovering oil from an oil-containing shale which comprises maintaining a liquid body comprising liquid eduction products below a vertical treating zone, passing said shale through said liquid body into said treating zone, maintaining a level of hot liquid eduction products in said hopper above the bottom opening of said kiln thereby preventing the ingress of air, drawing said shale down through said hot liquid eduction products into a feeding device submerged in said hot eduction products, initially preheating said shale, forcing said shale upwardly in said vertical kiln wherein said shale is further heated with a heated fluid medium flowing countercurrently thereto causing thereby the condensation of a portion of said fluid medium, causing said shale heated by said heated medium to continue to flow upwardly in said kiln, countercurrently contacting said upwardly flowing heated shale with an eduction medium comprising hot flue gases and steam whereby the major portion of said oil in said shale is educted therefrom and flows countercurrently to said upwardly flowing shale together with said eduction medium to form said fluid medium, contacting said upwardly flowing shale from which said major portion of said oil has been educted with steam and an oxygen-containing gas to induce combustion of the remaining portion of oil in said shale to furnish said eduction medium, contacting said shale from which said remaining portion of said oil has been burned with water to cool said shale and to utilize the sensible heat of combustion to vaporize said water to furnish said steam for said eduction medium, discharging the cooled shale from the upper portion of said vertical treating zone, allowing shale fines to settle in said liquid body, continuously removing liquid eduction products from the upper part of said liquid body to maintain a constant level of said liquid therein, continuously removing gases from the lower portion of said treating zone at a point above the said liquid level and after usage thereof to preheat said shale, and removing accumulated fines from the bottom of said liquid body.

2. A method for recovering oil from shale which comprises introducing said shale through a liquid sealing medium into the lower portion of a treating zone, passing said shale upwardly through said zone wherein said shale is preheated and subsequently educted to form a carbonaceous shale and the carbonaceous shale is contacted with an oxygen-containing gas to induce combustion of carbonaceous materials therein, passing an eduction medium comprising the gaseous products of said combustion downwardly through said eduction zone countercurrent to said shale, maintaining a liquid body of condensed steam and educted oil below said treating zone to act as said liquid sealing medium and to provide for settling of shale fines therein, withdrawing uncondensed gases comprising products of eduction from the lower portion of said treating zone at a point just above said liquid body, withdrawing accumulated fines from the bottom of said liquid body, and withdrawing liquid oil substantially free from said fines from the upper portion of said liquid body.

3. A method according to claim 2 in which the combustion of the carbonaceous shale is controlled by controlling the point of entry of said oxygen-containing gas.

4. A method according to claim 2 in which a portion of the uncondensed gases withdrawn from the lower portion of the treating zone is recycled to the top of the treating zone.

5. A method according to claim 2 in which a portion of the fines is recycled to the treating zone with the shale feed.

6. An apparatus for educting oil from oil shale which comprises in combination a vertical eduction kiln opening at its lower end into a housing, a hopper opening into said housing at a point adjacent to said vertical kiln, a shell surrounding the lower portion of said kiln and communicating with the said hopper at its lower end, said shell, hopper, housing and kiln being adapted to permit collection of liquid products of eduction and maintenance of a body of liquid completely filling said housing and partly filling said hopper, shell and kiln so as to form a liquid seal permitting introduction of shale into said housing through said hopper without permitting simultaneous ingress of air therewith, a vertically acting reciprocating pump within said housing adapted to receive shale from said hopper and discharge it vertically upward through said kiln, means for introducing air into the upper portion of said kiln so as to permit combustion of carbonaceous shale therein, means for passing the resulting hot gaseous products of combustion downward through said kiln countercurrent to said shale so as to educt liquid and gaseous products of eduction therefrom, apertures in the walls of the lower portion of said kiln to permit passage of liquid and gas into said surrounding shell without permitting passage of shale therewith, liquid removal means for maintaining a constant level of said liquid body in the lower portion of said kiln and the surrounding shell, means for withdrawing gaseous combustion products and gaseous eduction products from said shell at a point just above said liquid level, and means for removing accumulated fines from the bottom of said housing.

7. An apparatus for educting oil from oil shale which comprises in combination a vertical eduction kiln, means for introducing shale into the bottom opening of said eduction kiln through a body of liquid forming a liquid seal whereby air is prevented from entering therewith, said last named means comprising a housing, a hopper opening into said housing at a point adjacent said vertical kiln, a pivotably mounted cylinder located in said housing and adapted to pivot through an angular displacement equivalent to the angle of separation between said hopper opening and said kiln opening, a piston mounted in said cylinder, means for causing said cylinder to oscillate through said angular displacement with the reciprocation of said piston in such related sequence that said piston will travel from the upper extremity to the lower extremity of said cylinder when the upper opening of said cylinder is positioned beneath said opening from said hopper and will travel from the lower extremity to the upper extremity of said cylinder when the same is positioned beneath said opening of said eduction kiln, means fastened to said cylinder to automatically seal off said openings alternately when said cylinder is alternately positioned beneath the other, ports in the lower portion of said kiln to permit passage of fluids without passage of shale, a shell surrounding said ports and communicating at its lower end with said housing and said hopper, means for withdrawing liquid and gas from said shell, and means for withdrawing accumulated fines from the lower portion of said liquid body.

8. An apparatus according to claim 7 in which the shell is so arranged that shale fines escaping from the ports in the walls of the lower portion of said kiln drop into the cylinder and are recycled with the shale feed.

9. An apparatus for educting oil from oil bearing solids which comprises a vertical kiln having a bottom opening into a pump housing, a hopper also having a bottom opening into said housing, a pump within said housing adapted to receive said oil bearing solids from said hopper and discharge them into said kiln, a shell adjacent the lower end of said kiln and communicating therewith through apertures in the walls thereof, an opening between said shell and said hopper at the lower part of said shell and said hopper, means for maintaining a body of liquid within said shell with a liquid level sufficiently high to seal said opening between said shell and said hopper, means for removing liquid and gas from said shell, and means for removing solid fines from the bottom of said housing.

10. An apparatus for recovering oil from oil bearing solids which comprises a vertical kiln, means for introducing said solids into a hot sealing liquid comprising hot liquid eduction products, said sealing liquid substantially filling the lower portion of the kiln to prevent ingress of air with said solids, means for passing said solids upwardly through said kiln, said means comprising a vertically acting reciprocating pump completely immersed in said hot sealing liquid to heat the solids passed therethrough, means for introducing air at a controlled rate into the upper portion of said kiln for burning carbonaceous solids therein so as to obtain hot gaseous products of combustion therefrom, means for removing liquid eduction products and gaseous products of combustion and gaseous products of eduction from the lower portion of said kiln, and means for removing separated solids fines from said liquid eduction products.

11. A continuous method of recovering oil from oil bearing solids which comprises introducing said solids into a liquid sealing medium comprising hot eduction products, forcing the thus submerged solids upward through said hot eduction products thereby initially preheating said solids, subsequently forcing said solids upward through a vertical treating zone, therein further preheating said solids, subsequently educting oil therefrom in the presence of hot combustion gases to form carbonaceous solids, burning the carbonaceous solids with a controlled amount of an oxygen-containing gase to form said hot combustion gases, maintaining a liquid body of hot educted oil at the bottom of said treating zone, employing one portion of said liquid body as said liquid sealing medium, settling fines in a second portion of said liquid body, removing educted oil from the first portion of said liquid body, removing settled fines from the second portion of said liquid body, and maintaining a pressure gradient between the upper portion of said treating zone and the lower portion of said treating zone by withdrawing the said combustion gases from a point immediately above the surface of said liquid body.

12. A method for recovering oil from oil bearing solids which comprises introducing said solids through a liquid sealing medium into the lower portion of a treating zone, passing said solids upwardly through said zone wherein said solids are preheated and subsequently educted to form carbonaceous solids and the carbonaceous solids is contacted with an oxygen-containing gas to induce combustion of carbonaceous materials therein, passing an eduction medium comprising the gaseous products of said combustion downwardly through said eduction zone countercurrent to said solids, maintaining a gas space and educted oil in an accumulation zone located below said treating zone, employing said educted oil as said liquid sealing medium, withdrawing uncondensed gases including combustion gases and gaseous products of eduction from said gas space, allowing said educted oil to settle to separate solids fines suspended therein, withdrawing fines from the lower portion of the settled educted oil, and withdrawing educted oil so as to maintain a constant liquid level thereof.

13. A method for educting oil from oil bearing solids which comprises introducing said solids through a liquid sealing medium into the lower portion of a treating zone, passing said solids upwardly through said treating zone through successive zones of eduction and combustion, heating said solids in said eduction zone by means of an eduction medium comprising hot combustion gases so as to educt oil therefrom and produce a carbonaceous solids residue, burning said carbonaceous solids in the presence of an oxygen-containing gas in said combustion zone to provide said hot combustion gases, passing the educted oil together with combustion gases downwardly through said treating zone to the lower portion thereof, separating said combustion gases from said educted oil, maintaining a gas space and a liquid body of educted oil in an accumulation zone below the lower portion of said treating zone, employing one portion of said liquid body as said liquid sealing medium and settling fines in a second portion of said liquid body, withdrawing educted oil from the upper portion of said liquid body and withdrawing the settled fines from the lower portion of said liquid body.

14. An apparatus for educting oil from oil bearing solids which comprises a vertical eduction kiln, means for maintaining a liquid body comprising educted oil at the lower portion of said kiln, hopper means for introducing solids feed into one portion of said liquid body, vertically acting pumping means for forcing the submerged solids up through said liquid body and through said kiln, means for introducing air into the upper portion of said kiln so as to burn carbonaceous solids therein, means for separately removing liquid and gaseous products of eduction from the lower portion of said kiln and means for removing settled solids fines from a second portion of said liquid body.

15. An apparatus according to claim 14 in which the two portions of the liquid body are connected by a pressure release line.

16. An apparatus for educting oil from shale which comprises a vertical eduction kiln, means for maintaining a liquid body comprising hot educted oil at the lower portion of said kiln, hopper means for introducing shale feed into one portion of said liquid body, vertically acting pumping means completely immersed in said liquid body for forcing the submerged shale up through said liquid body and said kiln, means for introducing air into the upper portion of said kiln so as to burn carbonaceous shale therein, perforations in the lower portion of said kiln to permit passage of fluids therefrom, a shell surrounding the perforated portion of said kiln, said shell being closed at its upper end and having a sloping bottom communicating at its lower end with said hopper means below the surface of said liquid body so that a portion of the fines is recirculated with the shale feed, and means for separately removing liquid and gaseous products of eduction from said shell.

17. An apparatus according to claim 16 in which there is also provided means for removing settled fines from a second portion of said liquid body.

18. An apparatus according to claim 10 in which the means for removing the products of eduction is connected to means for separating liquid and gaseous products of eduction.

CLYDE H. O. BERG.

REFERENCES CITED

The following references are of record in the file of this patent:

UNITED STATES PATENTS

| Number | Name | Date |
|---|---|---|
| 475,203 | Colton | May 17, 1892 |
| 687,656 | Schneider | Nov. 26, 1901 |
| 942,501 | Isbell | Dec. 7, 1909 |
| 1,049,994 | Chapman | Jan. 7, 1913 |
| 1,146,776 | Wallman | July 13, 1915 |
| 1,440,828 | Schafer | July 3, 1923 |
| 1,469,628 | Dundas | Oct. 2, 1923 |
| 1,509,667 | Catlin | Sept. 23, 1924 |
| 1,603,793 | Olto | Oct. 19, 1926 |
| 1,607,240 | Davis | Nov. 16, 1926 |
| 1,607,241 | Davis | Nov. 16, 1926 |
| 1,609,128 | Richardson | Nov. 30, 1926 |
| 1,639,356 | Wallace | Aug. 16, 1927 |
| 1,669,024 | Runge | May 8, 1928 |
| 1,689,202 | Hare | Oct. 30, 1928 |
| 1,698,907 | Carr | Jan. 15, 1929 |
| 1,703,192 | Hampton | Feb. 26, 1929 |
| 1,716,667 | Shilling | June 11, 1929 |
| 1,709,838 | Carrey | Apr. 23, 1929 |
| 1,734,970 | Jenson | Nov. 12, 1929 |
| 1,803,686 | Andrews | May 5, 1931 |
| 1,824,282 | Loughrey | Sept. 22, 1931 |
| 1,826,007 | Leobell | Oct. 6, 1931 |
| 1,866,730 | Sperr | July 12, 1932 |
| 2,033,338 | Kirby | Mar. 10, 1936 |
| 2,238,792 | Hanawalt | Apr. 15, 1942 |
| 2,293,675 | Martin | Aug. 18, 1942 |

FOREIGN PATENTS

| Number | Country | Date |
|---|---|---|
| 20,160 | Australia | 1934 |

Certificate of Correction

Patent No. 2,501,153                                            March 21, 1950

CLYDE H. O. BERG

It is hereby certified that error appears in the printed specification of the above numbered patent requiring correction as follows:

Column 7, lines 67 to 74, strike out the comma and words ", maintaining a level of hot liquid eduction products in said hopper above the bottom opening of said kiln thereby preventing the ingress of air, drawing said shale down through said hot liquid eduction products into a feeding device submerged in said hot eduction products, initially preheating said shale, forcing said shale upwardly in said vertical kiln";

and that the said Letters Patent should be read with this correction therein that the same may conform to the record of the case in the Patent Office.

Signed and sealed this 8th day of August, A. D. 1950.

[SEAL]

THOMAS F. MURPHY,
*Assistant Commissioner of Patents.*